United States Patent [19]
Antolini

[11] Patent Number: 5,688,292
[45] Date of Patent: Nov. 18, 1997

[54] METHOD OF MANUFACTURING CATHODES FOR FUEL CELLS

[75] Inventor: Ermete Antolini, Genoa, Italy

[73] Assignee: Finmeccanica S.p.A. Azienda Ansaldo, Genoa, Italy

[21] Appl. No.: 417,590

[22] Filed: Apr. 6, 1995

[30] Foreign Application Priority Data

Apr. 19, 1994 [IT] Italy ................... MI94A0753

[51] Int. Cl.⁶ ................................. H01M 4/04
[52] U.S. Cl. ........................... 29/623.1; 429/44
[58] Field of Search ................ 429/40, 41, 42, 429/44, 45, 218, 223; 29/623.1, 623.5

[56] References Cited

U.S. PATENT DOCUMENTS

| | | | |
|---|---|---|---|
| 4,992,341 | 2/1991 | Smith et al. | 429/40 |
| 5,021,303 | 6/1991 | Donado | 429/16 |
| 5,354,627 | 10/1994 | Hatoh et al. | 429/40 |
| 5,432,138 | 7/1995 | Hofmann | 501/153 |

*Primary Examiner*—M. Nuzzolillo
*Attorney, Agent, or Firm*—Loeb & Loeb LLP

[57] ABSTRACT

A method of manufacturing cathodes for molten carbonate fuel cells containing lithiated nickel oxide, generally known in the art by the initials MCFC, which have matrices of ceramic material prepared with the use of an organic binding agent, comprises the preparation of a mixture containing nickel powder, lithium carbonate, polyvinyl butyral and ethanol, the mixture being suitably processed, cut into cathode form and mounted directly inside one of the fuel cells, the cell then being heated to its working temperature, enabling all of the organic agents to be eliminated from the mixture, saving time and energy.

14 Claims, No Drawings

METHOD OF MANUFACTURING CATHODES FOR FUEL CELLS

BACKGROUND OF THE INVENTION

1. Field of the Invention

The present invention relates to a method of manufacturing cathodes for fuel cells.

In particular, it relates to a method of manufacturing cathodes based on lithiated nickel, for molten carbonate fuel cells, generally known in the art by the initials MCFC, which have matrices of ceramic material prepared with the use of an organic binding agent.

2. Description of the Prior Art

The prior art relating to the manufacture of cathodes of the type specified provides for two distinct techniques known as "in situ" and "ex situ" techniques, respectively.

The "in situ" technique comprises the preparation of a mixture containing at least one nickel compound which is intended to be presintered in a reducing atmosphere to produce a nickel plate. The plate is then placed in the cell where the nickel is oxidised and lithiated.

This technique has two main disadvantages. The first consists of the fact that, during the reactions in the cell, the plate is subject to expansion with a consequent possibility of the cathode breaking. The second consists of the fact that the lithium necessary for lithiating the plate comes from the electrolyte and the composition of the eutectic mass of the molten carbonates is thus modified.

The "ex situ" technique provides for the sintering of a mixture containing nickel and lithium carbonate in an atmosphere of oxygen or air, which results in a lithiated nickel oxide plate. Alternatively, the mixture may not contain lithium and the lithiating may take place subsequently, as in the "in situ" technique.

This technique overcomes the problems relating to the "in situ" technique, but cathodes thus produced have decidedly poorer performance than the others.

European patent application NO. 91108138.8 describes an "in situ" technique which provides for the assembly of a mixture containing nickel powder, lithium carbonate, deionized water, and an organic binding agent, directly in the cell and without presintering, and the heating of the fuel cell to its working temperature.

In this way, the oxidation without presintering does not cause expansion of the cathode and the lithiating takes place at the expense of the lithium carbonate of the mixture before the carbonates of the cell are melted.

In the method described above, however, the procedure for heating the cell is very complex since it is necessary to provide for numerous pauses to eliminate organic binding agents from the cathode mixture and from the ceramic matrix. This complexity results in an increase in times and hence in costs.

Moreover, the time for which it is necessary to wait for the water to evaporate from the mixture before it is introduced into the fuel cell also contributes to the increase in time.

SUMMARY OF THE INVENTION

The technical problem upon which the present invention is based is to provide a method of the type specified which overcomes the problems mentioned with reference to the prior art.

This problem is solved by a method of manufacturing cathodes for molten carbonate fuel cells comprising lithiated nickel oxide, the cells having matrices of ceramic material prepared with an organic binding agent, characterized in that it comprises the following steps:

the preparation of a mixture comprising:
  nickel powder;
  lithium carbonate;
  an organic binding agent the same as that used for the matrix;
  a low-boiling organic solvent;
the evaporation of the solvent;
the introduction of the mixture into the molten carbonate fuel cell;
the heating of the cell to its working temperature.

The main advantage of the method according to the invention is that it achieves a considerable saving in time and energy with resulting economic advantages.

Various types of organic binding agents are known, amongst the most common being polyvinyl butyral and methyl cellulose; according to a preferred version of the method according to the invention, the organic binding agent used both for the cathode and for the matrix of the fuel cell is polyvinyl butyral.

Moreover, the low-boiling organic solvent, which preferably has a boiling point of between 50° C. and 100° C. is a $C_1$–$C_3$ alkanol, preferably ethanol.

Preferably, the mixture may also comprise at least one dispersant; those normally used, such as, for example, triolein, tristearin and tripalmitin, form part of the saturated and unsaturated triglycerides group. Triolein is advantageously used in the method according to the invention.

The mixture may also comprise at least one plasticizer such as, for example, one of the polyethylene glycols, or diethylene glycol dipelargonate, triethylene glycol di-2-ethyl butyrate, or even polyethylene glycol di-2-ethyl hexanate. A polyethylene glycol is advantageously used in the method according to the invention.

Moreover, the method according to the invention leads to more effective results if the preparation of the mixture comprises the following steps in succession:

the formation of a first suspension of nickel powder and lithium carbonate in ethanol and triolein;

the homogenization of the first suspension;

the addition of polyvinyl butyral and polyethylene glycol to produce a second suspension with subsequent mixing of the second suspension until it is completely homogenized;

the degassing of the second suspension;

the tape casting of the resulting mixture in a strip, at a pouring rate of between 10 cm/min and 20 cm/min and with a distance of the blade from the substrate was within the range of from 1 mm to 5 mm.

At this point, the mixture is cut into cathode form and mounted directly in the cell where it will be heated to the working temperature of the cell during the starting procedure.

It is important to note that the working temperature for molten carbonate fuel cells generally varies between 600° C. and 700° C. and is preferably about 650° C. At this value, the eutectic mixture of carbonates which performs the functions of an electrolyte, is completely molten.

The oxidation of the nickel, which does not involve increases in volume since the mixture has not been presintered, and the lithiating of the nickel oxide takes place in the mixture during the heating. The lithiating takes place at the expense of the lithium carbonate of the mixture and not of the lithium in the electrolyte since, during lithiating, the latter is still in the solid state.

The following proportions by weight of the components may preferably be used in the preparation of the mixture:

nickel powder 100–150 parts
lithium carbonate 5–8 parts
polyvinyl butyral 6–15 parts
polyethylene glycol 6–15 parts
ethanol 50–80 parts
triolein 1–3 parts to be homogenized as stated above.

During the heating procedure not only is the nickel oxidized and lithiated, but the organic agents used are also driven off. This procedure according to the invention is greatly simplified by the use of the same organic binding agent for the cathode and for the matrix of the fuel cell.

The procedure provides for heating gradients preferably with values of between 20° C./hour and 60° C./hour with pauses of eight hours at 100 ° C., eight hours at 450° C. and ten hours at 650° C.

At the same time, gas-flows are established at the cathode and at the anode. The compositions of the flows vary according to the temperature reached and include carbon dioxide, oxygen, nitrogen, air and hydrogen.

An example of the implementation of the method of manufacturing cathodes for fuel cells according to the invention will be described below by way of non-limiting example.

EXAMPLE

A first suspension comprising INCO 255 nickel powder and lithium carbonate in ethanol as the low-boiling organic solvent and in triolein as the dispersant was prepared, the quantities of the individual components are given with reference to 100 grams of nickel powder:

nickel INCO 255 100 g
lithium carbonate 5.5 g
ethanol 55 g
triolein 2 g

The first suspension was placed in a mill constituted by a rotary container containing alumina balls. The suspension was homogenized therein for two hours with high-speed rotation.

The organic binding agent and the plasticizer were then added in the following quantities, with reference to 100 grams of nickel powder:

polyvinyl butyral 8 g
polyethylene glycol 8 g producing a second suspension.

The polyethylene glycol used was of the type in which the atomic mass of the single polymer was 200.

The second suspension was mixed in the rotary mill at medium speed for twenty-four hours until it was fully homogenized. This was followed by two hours of mixing at low speed to eliminate the air bubbles which remained trapped in the mixture during the high-speed rotation.

The resulting mixture was then spread on a flat substrate formed by a strip of glass treated with beeswax to facilitate its subsequent removal. The spreading was carried out by the tape casting technique on a strip at a pouring rate of 15 cm/min. The distance of the blade from the substrate was 3 mm.

After the rapid evaporation of the ethanol, the resulting mixture, which set at ambient temperature, was cut into cathode form and then mounted directly in the cell together with a matrix of ceramic material prepared with polyvinyl butyral as the binding agent and with an anode of sintered nickel containing chromium.

The cell was then heated to 650° C. by the following starting procedure:

from ambient temperature to 200° C. with a heating gradient of 30° C./hour;
pause of 8 hours at 200° C.;
from 200° C. to 450° C. with a heating gradient of 30° C./hour;
pause of 8 hours at 450° C.;
from 450° C. to 650° C. with a heating gradient of 30°–60° C./hour;
from 100° C. to 650° C. with a cathode gas-flow having the following composition:
1.2% of $CO_2$ 0.6% of $O_2$ 98.2% of $N_2$
from 500° C. to 650° C. with an anode gas-flow having the following composition:
3.5% of $H_2$ 2% of $CO_2$ 94.5% of $N_2$
at 650° C. with a cathode gas-flow having the following composition:
5% of $CO_2$ 45% of air 50% of $N_2$
and with an anode gas-flow having the following composition:
56% of $H_2$ 33% of $CO_2$ 11% of $N_2$ Upon completion of the procedure it was found that the organic agents present had been completely eliminated and the nickel of the cathode and had been oxidized and sufficiently lithiated for correct operation of the fuel cell of the type specified.

I claim:

1. A method of manufacturing lithiated nickel oxide based cathodes for molten carbonate fuel cells having matrices of ceramic material prepared with an organic binding agent, the method comprising the steps:

(a) preparing a mixture comprising:
      nickel powder,
      lithium carbonate,
      an organic binding agent which is the same as that used for the matrices of ceramic material,
      a low-boiling organic solvent;
   (b) tape casting the mixture in a strip;
   (c) evaporating the solvent;
   (d) cutting the mixture into cathode form;
   (e) introducing the mixture into the molten carbonate fuel cell; and
   (f) heating the cell to its working temperature, whereby said nickel is oxidated and lithiated and said organic binding agent is driven off.

2. A method according to claim 1, wherein the organic binding agent is polyvinyl butyral.

3. A method according to claim 1, wherein the low-boiling organic solvent is a $C_1$–$C_3$ alkanol.

4. A method according to claim 3, wherein the low-boiling organic solvent is ethanol.

5. A method according to claim 1, wherein the mixture contains at least one dispersant.

6. A method according to claim 1, wherein the mixture contains at least one plasticizer.

7. A method according to claim 5, wherein the at least one dispersant is triolein.

8. A method according to claim 6, wherein the at least one plasticizer is a polyethylene glycol.

9. A method according to claim 1, wherein the step (a) for preparing the mixture comprises the following in succession:

(a) forming a first suspension of nickel powder and lithium carbonate in ethanol which is a low-boiling organic solvent and triolein which is a dispersant;

(b) homogenizing the first suspension;

(c) adding said organic binding agent and a polyethylene glycol as a plasticizer to the homogenized first suspension to produce a second suspension;

(d) subsequent mixing the second suspension until it is completely homogenized; and (e) degassing the second suspension.

10. A method according to claim 9, wherein the mixture contains, in proportions by weight:

nickel powder 100–150 parts lithium carbonate 5–8 parts organic binding agent 6–15 parts polyethylene glycol 6–15 parts ethanol 50–80 parts triolein 1–3 parts.

11. A method according to claim 1, wherein the step of the heating is carried out in about the following manner:

from ambient temperature to 200° C. with a heating gradient of between 20° C./hour and 60° C./hour;

pause of 8 hours at 200° C.;

from 200° C. to 450° C. with a heating gradient of between 20° C./hour and 60° /hour;

pause of 8 hours at 450° C.;

from 450° C. to 650° C. with a heating gradient of between 20° C./hour and 60° /hour;

from 100° C. to 650° C. with a cathode gas-flow having the following composition:

1.2% of $CO_2$ 0.6% of $O_2$ 98.2% of $N_2$ from 500° C. to 650° C. with an anode gas-flow having the following composition:

3.5% of $H_2$ 2% of $CO_2$ 94.5% of $N_2$ at 650° C. with a cathode gas-flow having the following composition:

5% of $CO_2$ 45% of air 50% of $N_2$ and with an anode gas-flow having the following composition:

56% of $H_2$ 33% of $CO_2$ 11% of $N_2$.

12. The method according to claim 10, wherein said organic binding agent is polyvinyl butyral.

13. The method according to claim 11, wherein said organic binding agent is polyvinyl butyral.

14. A method of manufacturing lithiated nickel oxide based cathodes for molten carbonate fuel cells having matrices of ceramic material prepared with an organic binding agent, the method comprising the steps:

(a) preparing a mixture comprising:

nickel powder, lithium carbonate, an organic binding agent which is the same as that used for the matrices of ceramic material, a low-boiling organic solvent;

(b) tape casting the mixture in a strip;

(c) evaporating the solvent;

(d) cutting the mixture into cathode form; and (e) introducing the mixture into the molten carbonate fuel cell.

* * * * *